H. E. DOERR.
EQUALIZED CAR TRUCK.
APPLICATION FILED DEC. 26, 1913.
1,116,034.
Patented Nov. 3, 1914.
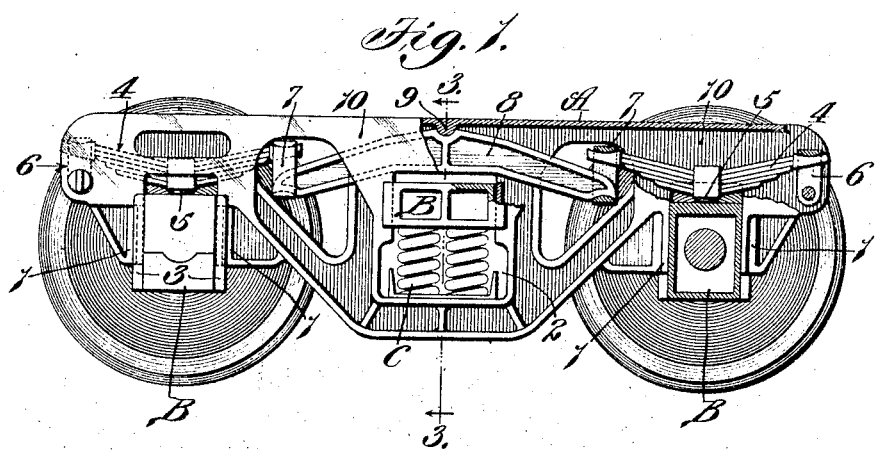
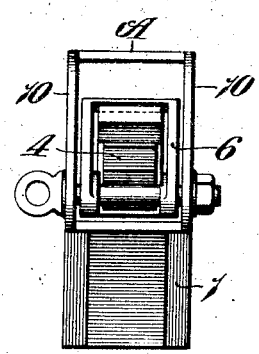
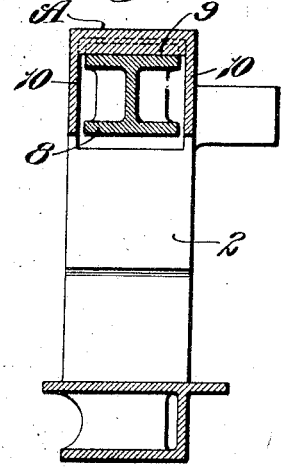
Witnesses:
Geo. R. Ladson
C. M. Badger
Inventor:
Harry E. Doerr.
By Bakewell & Cornwell Attys.

UNITED STATES PATENT OFFICE.

HARRY E. DOERR, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

EQUALIZED CAR-TRUCK.

1,116,034.     Specification of Letters Patent.     Patented Nov. 3, 1914.

Application filed December 26, 1913. Serial No. 808,837.

*To all whom it may concern:*

Be it known that I, HARRY E. DOERR, a citizen of the United States, residing at St. Louis, Missouri, have invented a certain new and useful Improvement in Equalized Car-Trucks, of which the following is a full, clear, and exact description, such as will enable others skilled in the art to which it appertains to make and use the same.

This invention relates to car trucks, and more particularly to that class known as equalized trucks.

The majority of the so-called equalized trucks now in general use employ a floating equalizer-bar that has its ends lying on top of a pair of journal-boxes and separated from the frame by a pair of spaced springs arranged intermediate the journal-boxes. When a shock, caused by unevenness in the roadbed, is received by one wheel of the pair, the equalizer-bar acts as a lever fulcrumed on the journal-box of the other wheel and transmits the shock through the springs to the wheel-piece or side frame. A truck of the construction just described is not in a true sense an equalized truck, in that a shock received by one wheel is not evenly distributed to both of the wheels on that side of the truck.

The main object of my present invention is to provide a four-wheel car truck of the class described, in which any vertical motion given to one of the journal-boxes thereof is transferred to its companion journal-box in even proportion. In other words, a shock caused by any unevenness in the roadbed, received by one wheel, will be equally divided between it and its companion wheel on the same side of the truck.

Another object is to provide a car truck in which the equalizing springs and beam are so disposed that the truck is rendered more flexible than the trucks now in general use.

Still another object is to provide a four-wheel car truck of the equalized type in which the equalizing springs and beam are practically inclosed or housed within the side frames. Other objects and desirable features of my invention will be hereinafter pointed out.

Figure 1 of the drawings is a side elevational view, partly broken away, of a car truck constructed in accordance with my invention; Fig. 2 is an end elevational view of one of the side frames of said truck; and Fig. 3 is a vertical sectional view of one of the side frames taken approximately on the line 3—3 of Fig. 1.

Referring to the drawings which illustrate the preferred form of my invention, A designates a cast metal side frame of a four-wheel car truck provided adjacent each end with a pair of pedestal jaws 1 for receiving journal-boxes B, and intermediate its ends with a depending portion in which is arranged an opening 2 for receiving the bolster B and the bolster-supporting springs C. Each of the journal-boxes B is provided with pairs of spaced guide lugs 3 on the side walls thereof that coöperate with the pedestal jaws 1 to maintain said journal-box in operative position in said frame, said journal-boxes being movable vertically independently of said frame, this vertical movement being controlled or regulated by means of springs 4, preferably of the semi-elliptic type, that are provided with spherical bearings 5 that lie directly on the top wall of each of the journal-boxes B. The outer end of each of the springs 4 is connected to a shackle 6 that is pivoted to the side frame A, and the inner end is engaged by a floating link 7. An equalizing beam or lever 8 is fulcrumed or pivoted at its center on a rounded projection 9 arranged on the under side of the top chord of the frame at approximately the center thereof, and the ends of said beam are connected to the floating links 7, as shown clearly in Fig. 1.

The side frame A is preferably formed from a single casting that is provided with a flat top chord from which depend side walls 10 at both the front and rear edges thereof, thus making the upper portion of said side frame of substantially inverted channel-shape in cross section, within the confines of which are arranged the equalizing springs 4 and the beam 8; and, while I have herein shown the pedestal jaws 1 as being formed integral with the side frame A, I do not wish to limit myself to this exact construction, as said jaws could be formed separately and bolted onto the side frame without departing from the spirit of my invention.

By forming the truck in the manner just described I am enabled to successfully employ the spherical bearings 5 on the springs 4 and eliminate all outside means for preventing lateral movement of the equalizing parts, for said parts, being housed in the upper portion of the frame A, are maintained in proper operative position and absolutely prevented from lateral displacement. By providing spherical bearings between the journal-boxes and the springs 4, the boxes are permitted to rock slightly within the limits of play allowed by the jaws 1 and the coöperating guide lugs 3, thus rendering the truck more flexible than the trucks now in general use. A shock, received by one of the wheels of the truck, places a strain on the journal of said wheel, that is automatically transmitted to the journal of the opposite wheel, in the same proportion in which it was received; or, in other words, the strain due to a shock received by one wheel is evenly divided between the journal of both wheels on that side of the truck, and the springs 4 being of equal tension will automatically restore the equalizing parts to their normal position after the shock has passed.

Having thus described my invention, what I claim as new and desire to secure by Letters Patent is:

1. In a car truck, a cast metal side frame, vertically movable journal boxes mounted in integral jaws on said side frame adjacent each end thereof, a depending portion integral with said side frame that is arranged between said journal boxes and provided with a bolster-receiving opening, and a beam fulcrumed on an integral pivot located centrally above said bolster-receiving opening, said beam having its ends yieldingly connected to said journal boxes.

2. In a car truck, a cast metal side frame, a pair of vertically movable journal boxes mounted in integral jaws on said side frame, an integral depending portion on said side frame that is arranged between said journal boxes and provided with a bolster-receiving opening, and means on said side frame arranged above said depending portion that coöperates with means on said journal boxes whereby a shock given to one of said journal boxes is transferred to the other of said journal boxes.

3. In a four-wheel truck, a pair of cast metal side frames provided with bolster-receiving openings, a pair of vertically movable journal boxes mounted in integral jaws formed on each of said side frames, a bolster and bolster-supporting springs, and levers fulcrumed at the longitudinal center of said side frames at a point above said bolster receiving openings and having the ends thereof yieldingly connected to said journal boxes.

In testimony whereof I hereunto affix my signature in the presence of two witnesses, this 22nd day of December 1913.

HARRY E. DOERR.

Witnesses:
 HARRY C. DREIBUSS,
 CHARLES P. GORMAN.